(12) United States Patent
Matsuhashi (10) Patent No.: US 7,668,329 B2
(45) Date of Patent: Feb. 23, 2010

(54) ACOUSTIN STRUCTURE OF SEAT BACK (75) Inventor: Masahiro Matsuhashi, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 982 days.

(21) Appl. No.: 11/178,504

(22) Filed: Jul. 12, 2005

(65) Prior Publication Data

US 2007/0014425 A1    Jan. 18, 2007

(51) Int. Cl.
*H04R 1/02* (2006.01)
*A47C 31/00* (2006.01)
*H04B 1/00* (2006.01)

(52) U.S. Cl. ............. 381/333; 381/388; 297/217.4; 297/217.5

(58) Field of Classification Search .......... 381/86, 381/301, 87, 333, 386, 388; 297/219.4, 219.5; 601/47

See application file for complete search history.

(56) References Cited

U.S. PATENT DOCUMENTS 5,101,810 A * 4/1992 Skille et al. ............ 601/47

7,159,938 B1 * 1/2007 Shiraishi ............... 297/217.4

FOREIGN PATENT DOCUMENTS

| JP | 2002-346476 | 5/2001 |
|----|-------------|--------|
| JP | 2004-97654  | 9/2002 |

* cited by examiner

*Primary Examiner*—Ping Lee
(74) *Attorney, Agent, or Firm*—Browdy & Neimark, PLLC (57) ABSTRACT

An acoustic structure of seat back, with an acoustic unit provided in a hole of padding of the seat back. The acoustic unit includes speaker unit(s) and a support box in which the speaker unit(s) is/are supportively received. The support box is accommodated in the afore-said hole of padding, with an opened side thereof facing to a forward side of the padding. A sound-conductive cushion element is supported by that support box so as to lie on a forward side of the speaker unit(s). The support box may include an acoustic hollow portion therein. Those padding and sound-conductive cushion element are covered with a trim cover assembly. A speaker support cushiony element may be provided in the support box to support the speaker unit(s), with a high sound conductivity. The speaker support cushiony element and/or the sound-conductive cushion element may be of network structure.

16 Claims, 5 Drawing Sheets

ACOUSTIN STRUCTURE OF SEAT BACK

BACKGROUND OF THE INVENTION

1. Field of the Invention

The present invention relates to a sound system in an automotive seat, and in particular to an acoustic structure of seat back provided with speakers, wherein a sound is emitted from speakers to an occupant or user on the seat.

2. Description of Prior Arts

There has been known an automotive seat of the type having speakers provided therein, which allows a sound, such as music, to be emitted from the speakers directly to an occupant on the seat, so that the occupant can fully enjoy the sound with both his or her ears and body.

In this kind of seat, as disclosed from the Japanese Laid-Open Patent Publication No. 2002-346476, the speakers are provided behind a cushion material forming one constituent element of the seat so as to be in contact with a reverse side of the cushion material. While not taught in that literature, normally, the speakers are secured to a spring element typically provided in the seat.

The foregoing conventional acoustic structure of seat has, however, been found defective in that:

(i) the cushion material used is a foam padding material formed from urethane foam for optimal cushioning effect, but, is not suited for imparting the sound therethrough because of its property of absorbing sound and degrading acoustic effect, and (ii) the sound emitted from each speaker is limited to a region which is substantially compassed by a diameter of the speaker itself, and such limited range of sound emission is directed to the back of an occupant on the seat, as a result of which, the occupant can not enjoy the music satisfactorily, and can not feel such vivid sound as if the music was performed in a real concert hall, neither, due to the foregoing sound absorption by the foam cushion material.

On the other hand, as known from the Japanese Laid-Open Patent Publication No. 2004-97654, there is a seat having exposed speakers in its seat back to enable direct emission of sound to an occupant on the seat. According thereto, a through-bore is formed in both of foam cushion material and top cover member of the seat back and a speaker is secured in the through-bore, so that a frontal side of the speaker is exposed from the frontal surface of seat back and directly faces toward the seat occupant. However, such exposed speakers interfere with the occupant's movement, thus impairing a comfortable seating condition of the seat, and further, the range of sound emission from such exposed speaker arrangement is limited to a narrow space around the seat occupant, so that the occupant can not fully enjoy the sound or music with his or her body.

SUMMARY OF THE INVENTION

In view of the above-stated drawbacks, it is a purpose of the present invention to provide an improved acoustic structure of seat back which allows for deep and wide expansion of a sound emitted from speakers in seat back to an entire area of back portion of a user (or a seat occupant) which is to rest on the seat back, thereby giving the occupant a splendid impression as if the music was actually and vividly played, while providing a far increased cushiony support touch to the user's back portion, with a high air permeability.

In order to achieve such purpose, the acoustic structure of seat back in accordance with the present invention is basically comprised of:

a padding provided in the seat back, the padding having a forward side situated forwardly of the seat back; a backward side situated backwardly of the seat back; a hole defined therein; and a seat back frame provided therein;

an acoustic unit including: at least one speaker means having a forward side from which a sound is to be emitted and a backward side; and a support box in which the at least one speaker means is supportively received, wherein the support box has: an opened side toward which the forward side of such at least one speaker means faces; and a backward wall opposite to the opened side, the backward wall facing to the backward side of the padding;

the support box being accommodated in the hole of the padding such that a whole of the acoustic unit is disposed in the hole of the padding and that the opened side of the support box faces to the forward side of the padding;

a sound-conductive cushion element which is supported by the support box, such that one side thereof faces to the forward side of the padding, while another side thereof faces to the forward side of the foregoing at least one speaker means; and a trim cover assembly covering the padding and the one side of the sound-conductive cushion element.

Preferably, the support box may be connected by a resilient connecting means with the seat back frame so as to be resiliently supported in the hole of the padding.

Preferably, an anchoring means be provided to and along the support box, and the trim cove assembly be securely anchored by the anchoring means to and along the opened side of the support box.

Preferably, the opened side of the support box be formed in a shape generally conforming to a contour of a back portion of a user which is to rest on the seat back, and wherein the sound-conductive cushion element is formed from an elastic plate material.

As another preferred aspect of the present invention, the acoustic structure may further comprise a speaker support cushiony element having a forward wall facing forwardly of the seat back and a backward wall facing backwardly of the seat back, wherein the foregoing at least one speaker means is resiliently supported in and by the speaker support cushiony element such that the forward side of the at least one speaker means is disposed at the forward wall of the speaker support cushiony element, wherein the speaker support cushiony element is securely accommodated in the support box, such that the backward wall thereof faces to the backward wall of the support box, and wherein the sound-conductive cushion element is firmly juxtaposed on the speaker support cushiony element, such that the afore-said another side thereof faces to the forward wall of the speaker support cushiony element as well as to the forward side of said at least one speaker means.

Preferably, the speaker support cushiony element may be of a network structure formed by netting straw-like fibers while bonding the straw-like fibers to one another at plural points by means of thermal fusing.

As another aspect of the present invention, the speaker support cushiony element may be formed with at least one recessed portion in the backward wall thereof, and such at least one recessed portion be closed by the backward wall of the support box, thereby defining an acoustic hollow portion between the at least one recessed portion and the backward wall of the support box.

Other various features and advantages will become apparent from reading of the description, hereinafter, with reference to the annexed drawings.

DETAILED DESCRIPTION OF PREFERRED EMBODIMENTS OF THE INVENTION

Referring to FIGS. 1 through 14, there are illustrated exemplary modes of acoustic structure of seat back of automotive seat in accordance with the present invention.

Reference numeral (10) indicates a generic mode of acoustic structure of seat back of automotive seat in accordance with the present invention, which commonly covers the non-distinctive exemplary embodiments of the seat-back acoustic structure which are shown in FIGS. 1 to 14. Designation (SB) represents an exemplary seat back used in the present invention.

Figure 1:
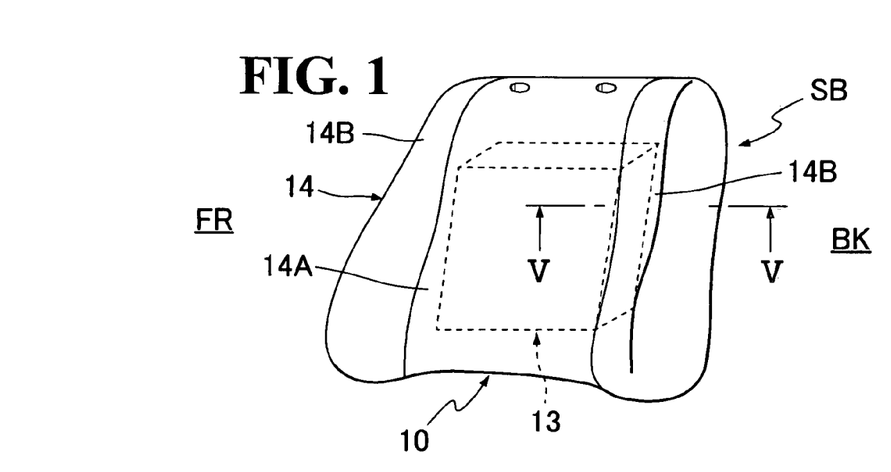
FIG. 1 is a schematic perspective view of a seat back having an acoustic structure of the present invention.
Figure 5:
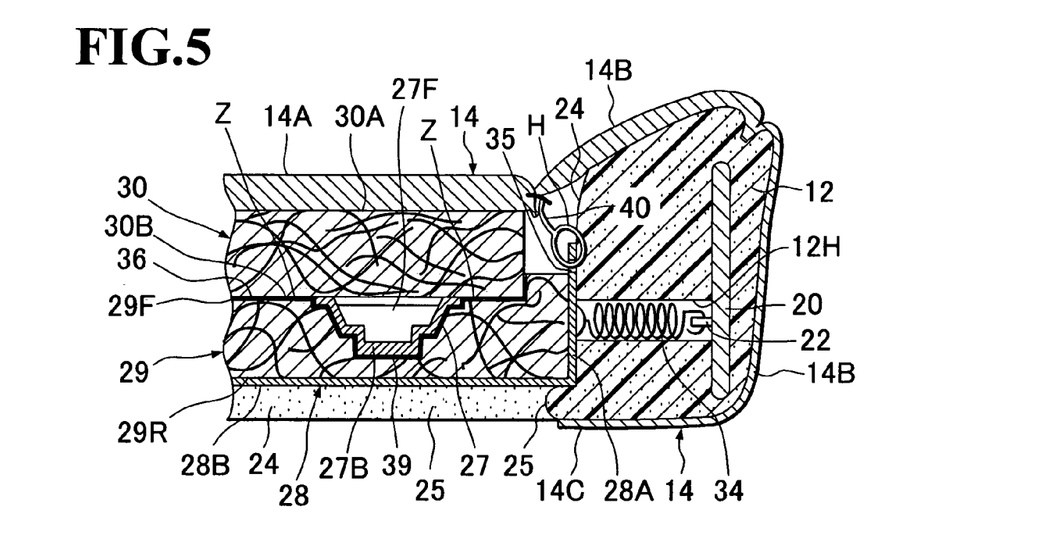
FIG. 5 is a sectional view taken along the line V-V in the FIG. 1.

As generally shown in FIGS. 1 and 5, the acoustic structure (10) for the seat back (SB) (which shall hereinafter be referred to as "seat-back acoustic structure (10)") is basically comprised of: an acoustic unit generally designated by (13); a seat-back foam padding (12) having a hole (24) in which the acoustic unit (13) is securely accommodated; and a trim cover assembly (14).

Figure 2:
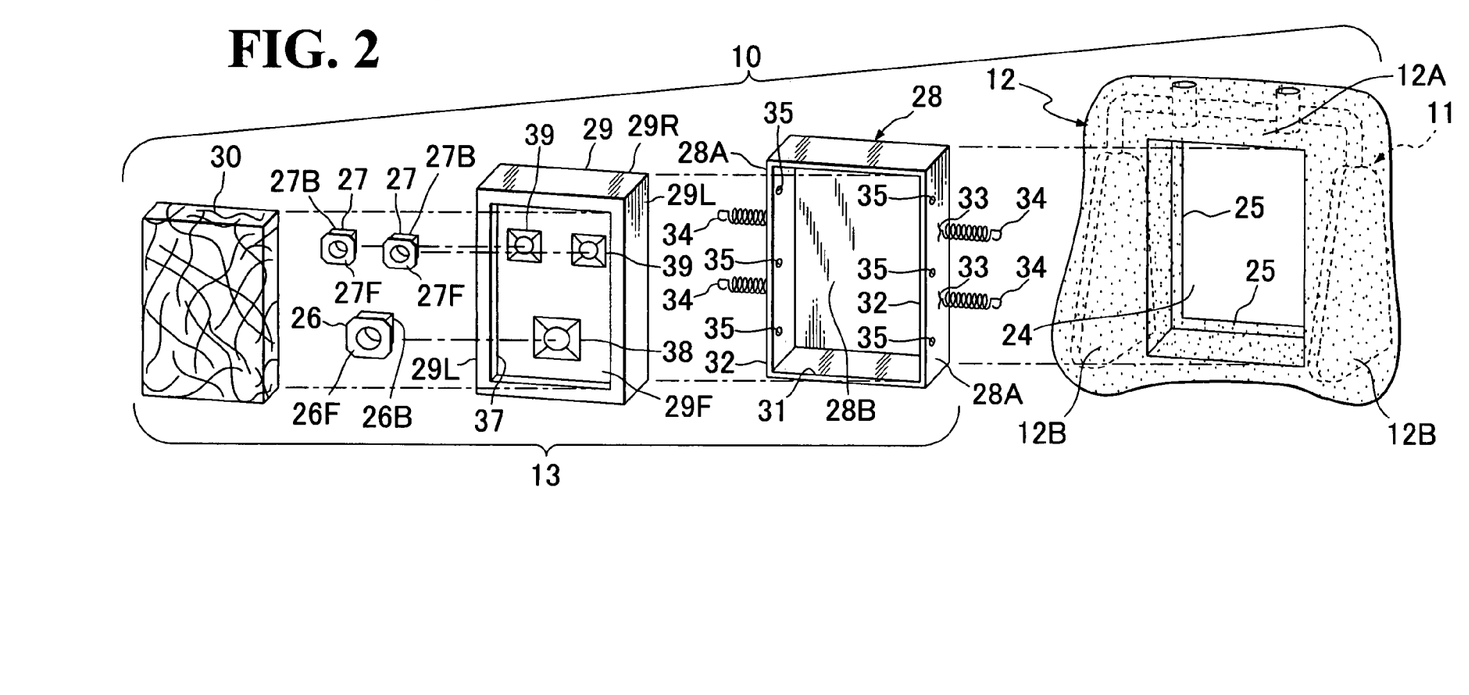
FIG. 2 is an exploded perspective view of the acoustic structure of seat back.

With particular reference to FIG. 2, the seat-back foam padding (12) is formed in a predetermined shape of seat back, which has a central padding portion (12A) defined centrally thereof and a pair of bolster lateral padding portion (12B) (12B) defined integrally on the opposite sides of the central padding portion (12A). As shown, a rectangular hole (24) is formed in the central padding portion (12A). Designation (25) denotes a rib portion (or flange portion) of the foam padding (12), which is integrally formed in the backward side of the foam padding (12) so as to circumscribe the rectangular though-hole (24). The rib portion (25) projects inwardly of the hole (24) as shown and thus serves to supportively and resiliently receive the acoustic unit (13) in the though-hole 24) as will be described later.

Figure 4:
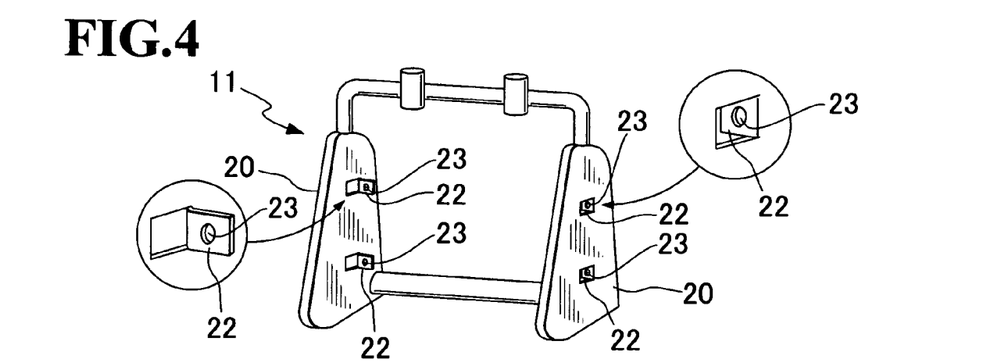
FIG. 4 is a schematic perspective view of a seat back frame to be provided in the seat back.

Integrally provided in the foregoing seat-back foam padding (12) is a seat back frame (11) as by a suitable known foaming process. As best shown in FIG. 4, the seat back frame (11) itself includes a pair of side frame members (20) (20) each having a pair of securing pieces (22) formed therein. Specifically, each securing piece (22) is formed by punching the corresponding region of the side frame member (22) and bending the same so as to project in a direction inwardly of the side frame member (22), as typically seen from FIG. 4. Formed in such inwardly upturned securing piece (22) is a securing hole (23) adapted for engagement with an end of securing spring to be set forth later.

Now, a brief description will be made of the acoustic unit (13). As shown in FIG. 2, as one element of the acoustic unit, there are provided a pair of small speaker units (27) (27), a large speaker unit (26) and a speaker support cushiony element (29) by way of example. As generally known, the two small speaker units (27) each operates to emit a high-pitched sound therefrom and the large speaker unit (26) operates to emit a low-pitched sound therefrom. In the shown mode, the two small speaker units (27) are securely fitted in the respective pair of securing holes (39) (39) formed side by side in an upper region of the cushiony speaker support element (29), while the large speaker unit (26) securely fitted in the securing hole (38) formed in a lower region of the speaker support cushiony element (29). The speaker support cushiony element (29) is securely accommodated in a support box (28). A sound-conductive cushion element (30) is also provided as one element of the acoustic unit (13) and juxtaposed on the speaker support cushiony element (29).

Thus, the acoustic unit (13) basically comprises the speaker units (26) (27), speaker support cushiony element (29), the support box (28), and the network cushiony plate member (30).

It is noted that designation (FR) denotes a forward direction toward a side forwardly of the seat back (SB) to which the present invention is applied, and designation (BK) denotes a side backwardly of the seat back (SB). Hence, hereinafter, the wording, "frontal", "forward", or "forwardly", shall refer to the forward direction or side (FR), whereas the wording, "backward", or "backwardly", refer to the backward direction or side (BK).

More specifically, each of the foregoing constituent elements of the acoustic unit (13) will be described as below.

Figure 3:
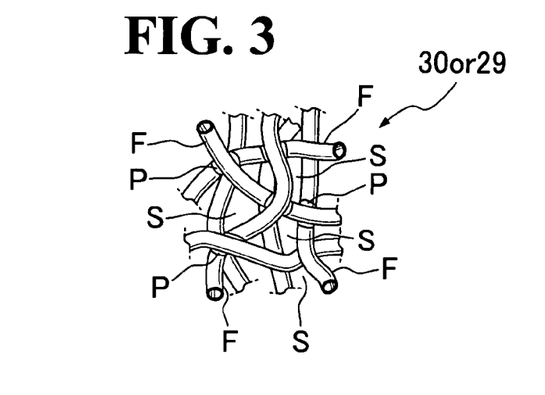
FIG. 3 is an enlarged view showing a network structure formed in a speaker support cushiony element and/or a sound-conductive cushion element which are/is associated with the acoustic structure of seat back.

The sound-conductive cushion element (30) is basically a cushiony plate material having a sound conductive property (which is of a rectangular shape in the shown embodiment). For example, as shown in FIG. 5, the sound-conductive cushion element (30) may be of a netted or network structure which is formed by netting continuous hollow fiber(s). More specifically, as best shown in FIG. 3, the sound-conductive cushion element (30) may be a network cushiony plate material which uses a hollow or straw-like fiber (F) formed from PET resin material (i.e. polyethylene terephthalate). Such straw-like fiber (F) is for example bent to provide a plurality of bent portions, and those bent portions of straw-like fiber (F) are entangled with one another, after which, a plurality points of the bent portions are bonded to one another by means of thermal fusing, as indicated by (P), with many spaces (S) given in the thus-fabricated network structure of fiber (F). In that way, a network cushiony plate element (30) is formed, which has a high sound conductivity and a high cushiony effect.

As will be described later, the network cushiony plate element (30) is juxtaposed on the small and large speaker units (27) (26) secured in the speaker support cushiony element (29). Thus, the network cushiony plate element (30) effectively allow sounds emitted from the speaker units (27) (26) to be imparted to an entirety of back portion of a user (or a seat occupant) which is to rest on the seat back (SB). In other words, with particular reference to FIG. 3, the network cushiony plate member (19) has many spaces (S) given therein, which allows a sound emitted from the speakers to expand freely and widely, and the continuous straw-like fiber (F) effectively increases the sound conductivity therethrough in contrast to a normal fiber having no hollow therein. Those effective points provide a high sound conductivity. Since the network cushiony plate element (30) expands wider than an area where all the three speakers (26) (27) are located, a sound emitted from the speakers is diffused wider than the outer size of each of the speaker and therefore the sound can smoothly be expanded in the entirety of the network cushiony plate element (30). Hence, the sounds from the speakers (26) (27) are imparted to an entirety of back of a user (not shown) which rests on the seat back (SB), without being limited to a localized area of the seat occupant's back. Such wide sound expansion even reaches the bones of the seat occupant, so that a great depth of the expanded sound gives the user such a splendid impression as if a music was played in a real concert hall for instance.

The speaker support cushiony element (29) is, generically stated, formed in a shape having a size generally equal to or slightly smaller than a size of the support box (28) and formed from an elastic material of a certain recovery force sufficient to support the speaker units (26) (27) therein. In the shown mode, it is of a rectangular shape having a size generally equal to or slightly smaller than a size of the support box (28). Designation (38) denote a lower securing hole formed in the lower region of the frontal surface (28F) of the speaker support cushiony element (29), the lower securing hole (38) being so adapted that the large speaker unit (26) is securely fitted therein. Designations (39) and (39) denote a pair of upper securing holes formed in the upper region of the frontal surface (28F) of the speaker support cushiony element (29). Each upper securing hole (39) is so adapted that the small speaker unit (27) is securely fitted therein.

As can be seen from FIGS. 2 and 3, the speaker support cushiony element (29) may be formed with a recessed area (37) in the frontal surface (29F) thereof. The recessed area (37) is substantially equal in size to the foregoing network cushiony plate element (30) with a view to easily placing that particular network cushiony plate element (30) in position therein.

As shown in FIG. 5, such speaker support cushiony element (29) may be so formed to have the same network structure as described above for the network cushiony plate element (30), thereby providing the speaker support cushiony element (29) itself with a high sound conductivity and a high cushiony effect. Alternatively, as can be seen from FIG. 2, the speaker support cushiony element (29) be formed from other suitable elastic material, such as a soft urethane foam material or a polystyrene foam material. In any case, the speaker support cushiony element (29) may be formed in a suitable and required manner, using the above-suggested materials, so as to be resiliently deformable to receive a back portion of user comfortably, with a certain permeability, while retaining the speakers (26) (27) against their undesired dislocation.

As understandable from FIGS. 2 and 5, the two small speaker units (27) are respectively securely fitted in the two upper securing holes (39), while the large speaker unit (26) is securely fitted in the lower securing hole (38), such that the frontal sides (27F) (26F) respectively of the small and large speaker units (27) (26) are exposed on the frontal surface (29F) of the speaker support cushiony element (29) in registry therewith. The backward side (30B) of the network cushiony plate element (30) is placed in the recessed area (37) of the speaker support cushiony element (29) and thermally fused and bonded thereto, as indicated by the bold line (Z), by means of ultrasonic fusing or hot-melt adhesive for instance.

In the shown embodiment, the support box (28) is formed in a rectangular shape having an opened side defined forwardly thereof, which thus has a backward wall (28B) formed backwardly thereof. The support box (28) is so dimensioned as to receive and support the foregoing speaker support cushiony element (29) therein. Designations (33) denote a plurality of securing pieces fixed to both of two lateral walls (28A) (28A) of the support box (28). As shown, a pair of coil springs (34) (34) are fixedly connected at their respectively ends with those securing pieces (33), whereupon the two coil springs (34) are provided at the opposite sides of the support box (28) as best shown in FIG. 2. Designations (35) denote a plurality of securing holes formed in both of the two lateral walls (28A) of support box (28), which are adapted for allowing hog rings (H) to be securely connected therewith, as will be described later.

The support box (28) is inserted and placed in the hole (24) of the foam padding (12), as understandable from FIGS. 2 and 5, while the free ends of the coil springs (34) are securely engaged in the respective securing holes (23) of the securing pieces (22) formed in the two side frames (20). At this point, the peripheral end portion of the backward wall (28) of support box (28) is abutted against and received by the rib portion (25) of the foam padding (12), as seen from FIG. 5. It is therefore appreciated that the backward side of support box (28) is resiliently supported by the rib portion (25) at a fixed or home position, as in FIG. 5, and, in addition thereto, the support box (28) as a whole is normally biased by the coil springs (34) to that home position.

Thereafter, the speaker support cushiony element (29) and network cushiony plate element (30), which have been bonded together as described earlier, are securely accommodated in the foregoing support box (28), whereupon an acoustic unit (13) is assembled and also resiliently secured in position within the foam padding (12).

Then, a trim cover assembly (14) is securely attached to the thus-assemble foam padding (12) such that the central cover section (14A) thereof covers the frontal side (30A) of sound-conductive cushiony element or network cushiony element (30) as well as the frontal padding portion (12A), and the two lateral cover sections (14B) (14B) thereof cover the respective two lateral padding portions (12B) (12B), while the backward peripheral end section (14C) covers the backward side of the foam padding (12), excepting the hole (24). In this regard, while not completely shown but understandable from FIG. 5, the hog rings (H) are respectively engaged in each of the afore-the holes (35) formed in the vertical walls (at 28A) of support box (28), so that the hog rings (H) are disposed along the opened side of the support box (28), whereas on the other hand, the anchor cloths (40) connected with the respective hog rings (H) are sewn with the central cover portion (14A) of trim cover assembly (14). Accordingly, the central cove section (14A) is anchored by the hog rings (H) and anchor cloths (40) to the support box (28) along a peripheral edge of the hole (24) of padding (12). That is, the central cover section (14A) is positively drawn and retained backwardly by means of hog rings (H) and anchor cloths (40) so as to closely contact the frontal surface (30A) of network cushiony plate element (30). In that manner, the assembly of seat back (SB) is completed, with the acoustic structure (10) provided therein.

In the embodiment described above, it is appreciated that a wide space and a sound conductive medium are ideally provided around the speaker units (26) (27). Such provision of acoustic unit (13) is effective in allowing sounds from the speakers (26) (27) to be deeply imparted to the entire back portion of user, so much so that a wide and deep sound expansion is realized and it can surely reach the bones of the user, thereby giving him or her such a splendid impression as if a music was actually played in a concert hall or the like. This sound effect may be greatly enhanced in the case where the speaker support cushiony element (29) is formed from the previously discussed network cushiony material as shown in FIG. 5 as well as FIG. 3, because, in that case, a sound conductivity is also attained behind the speakers (26) (27), thereby realizing a much wider and deeper sound expansion from those speakers. In addition, the network cushiony plate element (30) lies on the speakers (26) (27) to prevent a user or seat occupant from feeling an unpleasant projection of the speakers. Still further, both plate element (30) and speaker support element (29), which are of the network structure stated above, provides a high air permeability and an increased cushiony effect.

It is also appreciated that the provision of coil springs (34) effectively compensates for insufficient cushion effect of the network cushiony plate element (30), thus providing a more comfortable support effect to the back portion of a user or seat occupant, and further, in the case where a known active headrest device is provided in the seat back (SB) behind the acoustic unit (13), the coil springs (34) will serve to absorb objectionable movement of the acoustic unit (13) which will be caused by movement of movable parts of the active headrest device, thereby preventing unpleasant touch to a user's back portion in that case.

Figure 6:
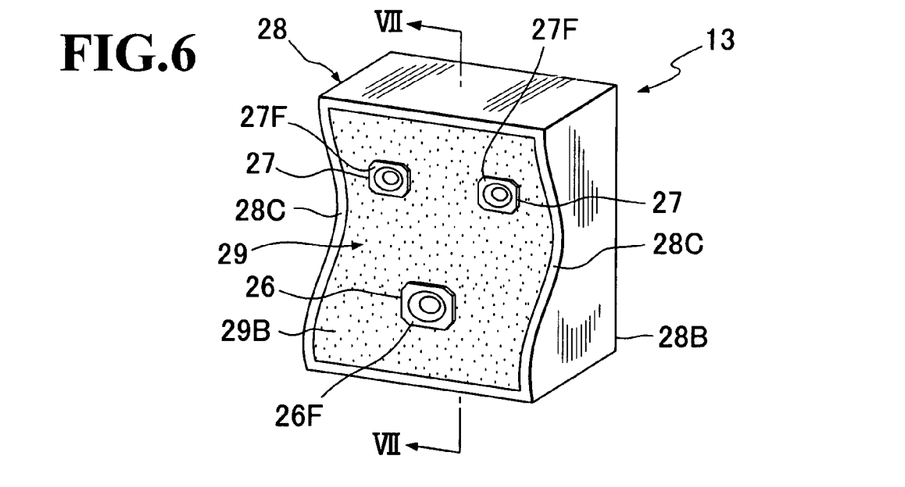
FIG. 6 is a schematic perspective view showing an alternative mode of an acoustic unit in the acoustic structure of seat back.

FIG. 6 shows an exemplary alternative mode of the support box (28) which is contemplated to receive an undulated contour of back portion of a user which is to rest on the seat back (SB), because, in fact, the user's back portion assumes an undulated contour, though not shown. Namely, as seen in FIG. 6, the support box (28) may be formed such that its two forward edge portions (28C) (28C) each assumes an undulated contour that generally conforms to a undulated back portion of user (not shown). In this case, the speaker support cushiony element (29) may be of a three-layer elastic lamination structure, as shown in FIG. 7, which comprises: a forward elastic layer (29B) having an outer undulated surface which generally conforms to such undulated back portion of user; an intermediate elastic layer (29A); and a backward elastic layer (29C).

Figure 7:
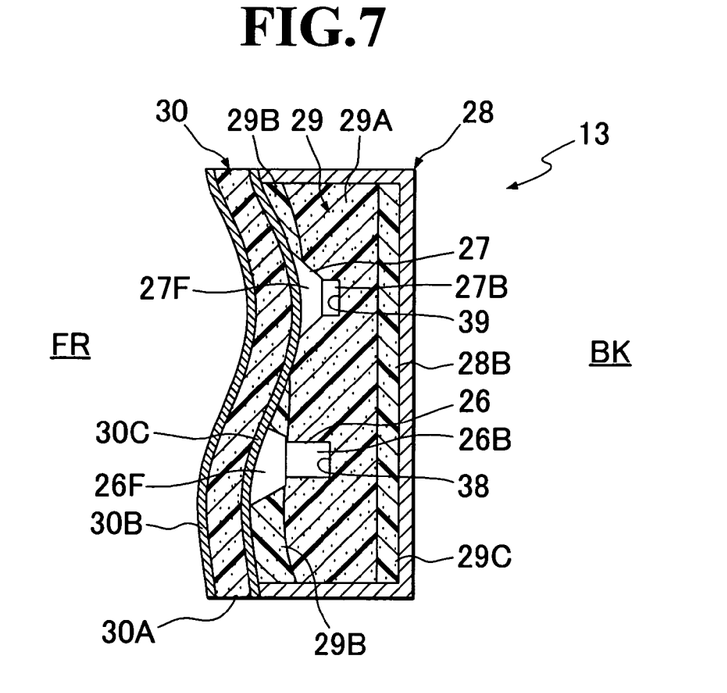
FIG. 7 is a longitudinal section of the acoustic unit shown in the FIG. 6, which shows another alternative mode of sound-conductive cushion element applied to the acoustic unit.

While not clearly shown but as understandable from FIGS. 6 and 7, the previously stated two upper securing holes (39) and lower securing hole (38) are formed in both of the forward and intermediate elastic layers (29B) (29A). Preferably, the forward elastic layer (29B) and backward elastic layer (29C) may be formed from a relatively hard elastic material, such as a hard urethane foam material, while the intermediate elastic layer (29C) be formed from a soft elastic material, such as a soft urethane foam material. In this embodiment, the sound-conductive cushion element (30) may comprise a thin elastic plate element which can cover the undulated side of the acoustic unit (13) in conformity therewith as shown in FIG. 7. According to the embodiment of the FIG. 7, the thin cushiony plate element, provided as the sound-conductive cushion element (30) and hereinafter designated by (30), may be formed by a three-layered elastic element having a certain air permeability (which therefore has a sound conductivity) and an elastic and robust property. Namely, as shown, the thin elastic plate element (30) may comprise: an outer elastic layer (30B) of a relatively hard material having an air permeability (e.g. a cloth material), an intermediate elastic layer (30A) of a soft material having an air permeability (e.g. a foam urethan material), and a backward elastic layer (30C) of a relatively hard material having an air permeability (e.g. a cloth material).

As shown, the large and small speaker units (26) (27) are securely fitted in the respective securing holes (38) (39) described above, so that the forward portions (26F) (27F) of those speaker units are positively retained by the forward elastic layer (29B) of a relatively hard material, while the backward portions (26B and 26F) of them are supported by the intermediate elastic layer (29A). Then, the thin cushiony plate element (30) is fixedly attached on and along the undulated outer surface of the forward elastic layer (29B) so as to overlie the forward sides (26F) (27F) respectively of the large and small speaker units (26) (27). Hence, in this particular mode of acoustic unit (13), the undulated back portion of user is fit received on and along the forward undulated surface of the acoustic unit (13) and the user can enjoy a much more comfortable back support touch. Of course, since a wide space and a sound conductive medium are ideally provided around the speaker units (26) (27), sounds can be emitted from the speakers (26) (27) and deeply imparted to the entire back portion of user, thus realizing a wide and deep sound expansion which surely reaches the bones of the user and therefore gives him or her such a splendid impression as if a music was actually played in a concert hall or the like.

Figure 8:
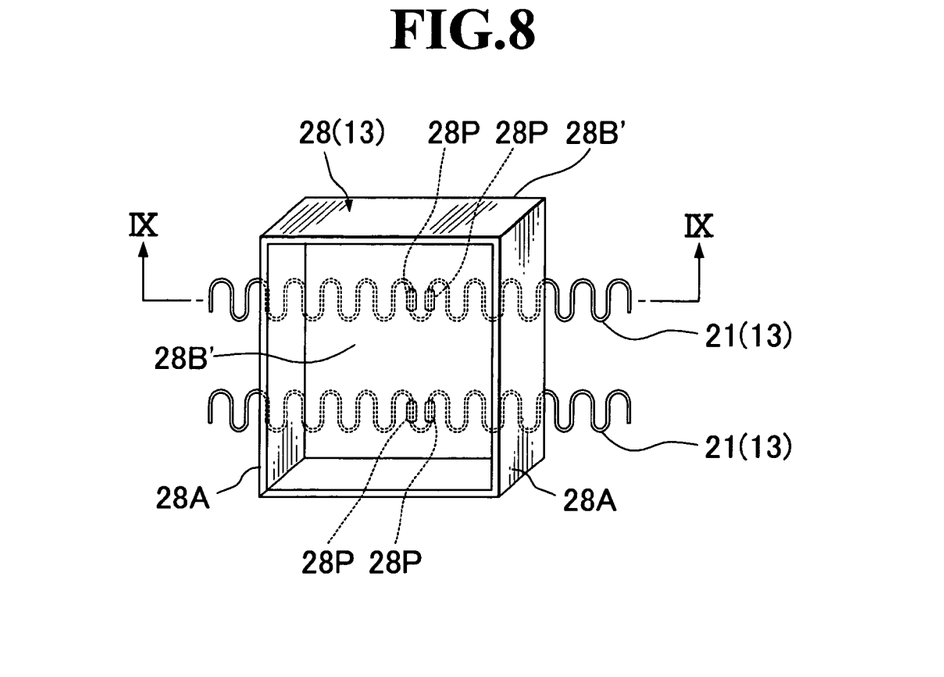
FIG. 8 is a schematic perspective view showing another alternative mode of support box.
Figure 9:
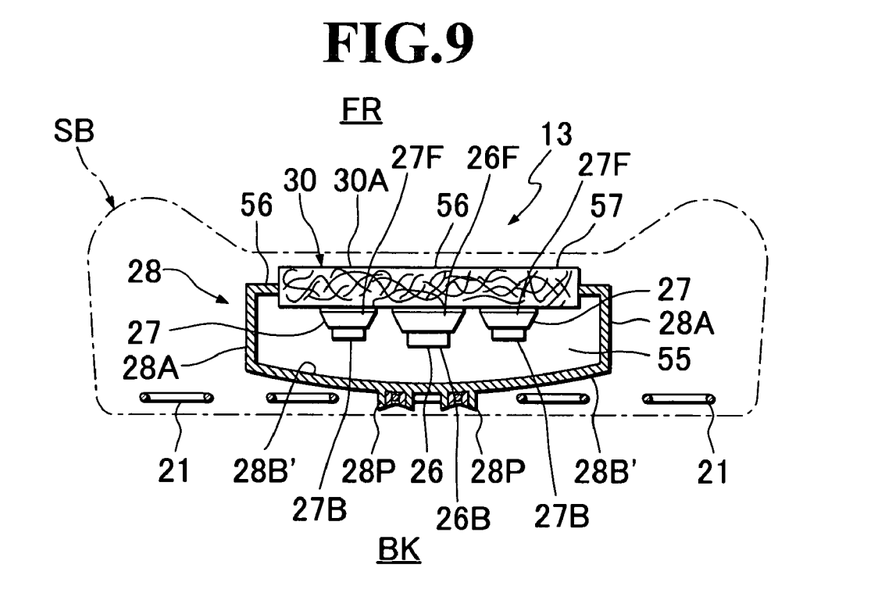
FIG. 9 is a sectional view taken along the line IX-IX in the FIG. 8.

FIGS. 8 and 9 show another alternative mode of acoustic unit (13). According thereto, in place of the foregoing coil springs (34), conventional sinuous springs (21), normally found in many of seat backs, are used as a part of the acoustic unit (13). Also, the support box (28) forming a part of the acoustic unit (13) as stated above has a cambered backward wall (28'), and further, a pair of upper securing pieces (28P) and a pair of lower securing pieces (28P) are formed in a center area of such convex backward wall (28'). As shown, the convex backward surface (28') of support box (28) are securely connected with the sinuous springs (21) by securely engaging the securing pieces (28P) with the sinuous springs (21). Likewise as in the above-described other embodiments, the above-described speaker support cushiony element (29) (thought not shown) may be provided in the thus-formed support box (28), then the small and large speaker units (27) (26) be securely accommodated in the speaker support cushiony element (29), and the sound-conductive cushiony plate element or the network cushiony plate element (30) be securely attached to the forward sides of the support box (28) as well as to the forward sides (26F) (27F) of the speaker units (26) (27), as shown in FIG. 9. In this particular mode, the connection of the support box (28) with the sinuous springs (21) is at a localized point centrally of the support box (28), whereby, in addition to the forward and backward movement of the support box (28) or the acoustic unit (13) which is allowed by the resilient action of the sinuous springs (21), the support box (28) or the acoustic unit (13) per se are also resiliently inclinable in one of right and left directions relative to the center of support box (28) as viewed from the FIGS. 8 and 9, hence improving the back support touch of seat back (SB).

Figure 10:
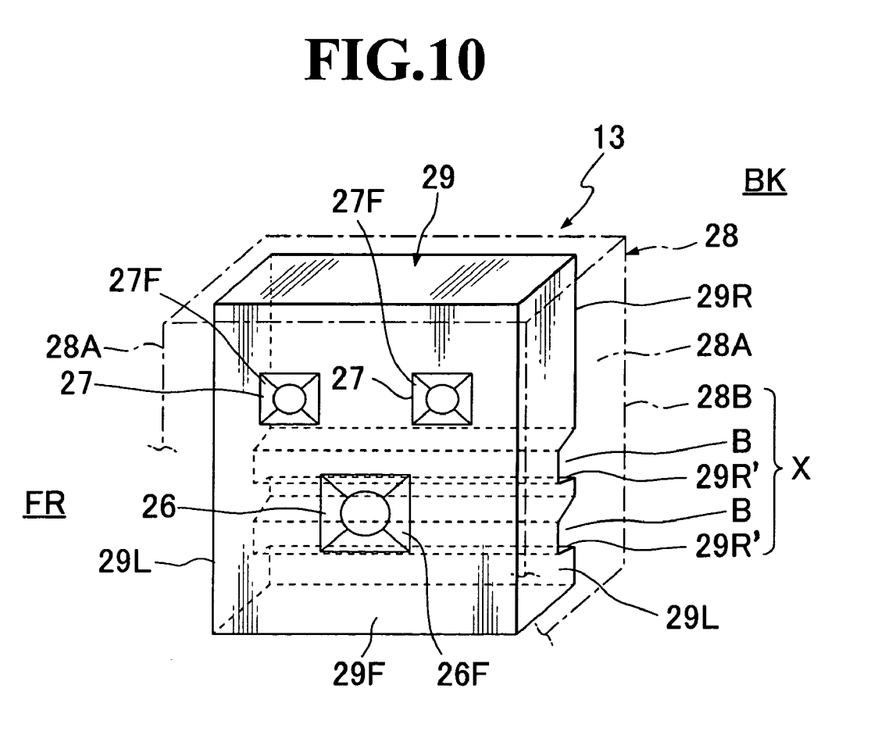
FIG. 10 is a schematic perspective view of another alternative mode of a speaker support cushiony element.
Figures 11, 12, 13, 14:
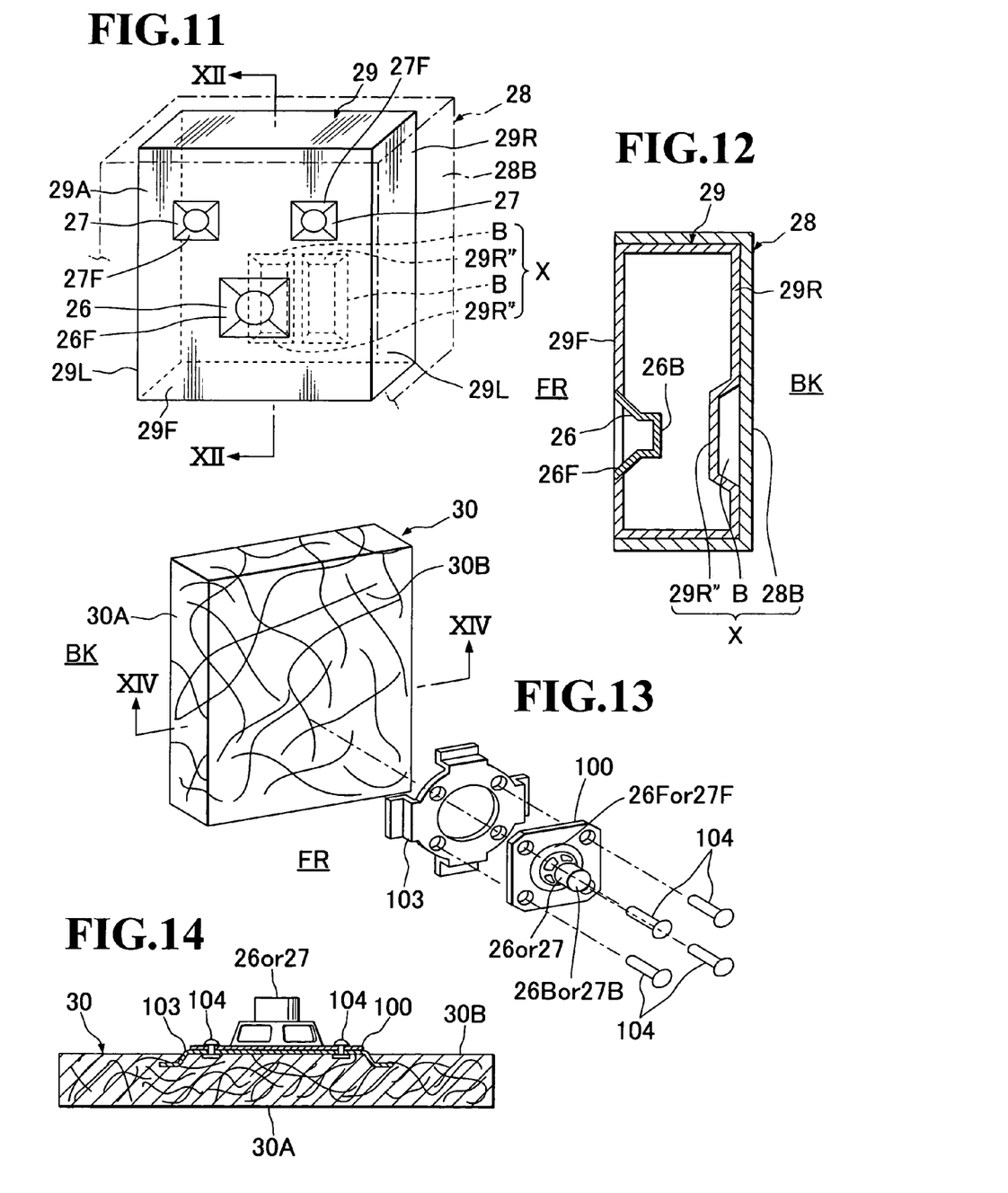
FIG. 11 is a schematic perspective view of still another alternative mode of the speaker support cushiony element.
FIG. 12 is a sectional view taken along the line XII-XII in the FIG. 11.
FIG. 13 is an exploded perspective view showing connection of speaker unit with the sound-conductive cushion element.
FIG. 14 is a sectional view taken along the line XIV-XIV in the FIG. 13.

FIGS. 10, 11 and 12 show a still another alternative mode of acoustic unit (13) wherein an acoustic hollow portion generally designated by (X) is defined between the backward wall (29R) of the speaker support cushiony element (29) and the backward wall (29B) of the support box (28) at a point corresponding to the large speaker unit (26). This provision of acoustic hollow portion (X) behind the large speaker unit (26) is effective in realizing a sufficient and wide expansion of a low-pitched sound emitted form that particular large speaker unit (26). It is noted here that the speaker support cushiony element (29) is formed from a suitable elastic material.

As suggested in FIG. 10 for example, the acoustic hollow portion (X) may be embodied by forming a pair of transverse recessed portions (29R') (29R') in the backward wall (29R) of speaker support member (29). As shown, the transverse recessed portions (29R) extend through the entire width of backward wall (29R) in a direction transversely thereof and are located behind the large speaker unit (26), thereby achieving the purpose of realizing a sufficient and wide expansion of a low-pitched sound emitted form the large speaker unit (26).

Alternatively, as suggested in FIGS. 11 and 12, the acoustic hollow portion (X) may be embodied by forming a pair of vertical recessed portions (29R") (29R") in the backward wall (29R) of speaker support cushiony element (29). As shown, those two vertical recessed portions (29R") are formed in a lower localized region of backward wall (29R) which corresponds to a point where the large speaker unit (26) is situated therebehind, so that a sufficient and wide expansion of a low-pitched sound emitted from the large speaker unit (26) is attained.

While not shown, preferably, the backward portion (26B) of the large speaker unit (26) may be exposed in either of the afore-said reverse and vertical recessed portions (29R') (29R") with a view to insuring a more sufficient expansion of low-pitched sound emitted from the large speaker unit (26).

FIGS. 13 and 14 show an example of securing either of the foregoing large speaker unit (26) and the foregoing small speaker unit (27) to the previously described sound-conductive cushion element (30).

In the present mode, a mount bracket (103) is used to allow the speaker unit (26 or 27) to be fixedly connected with the sound-conductive cushion element (30) via that mount bracket (103). This mount bracket (103) has been integrally fixed to the backward side (30B) of the sound-conductive cushion element (30) during the process of forming that particular sound-conductive cushion element (30), by means of an insert molding, an overlay molding, or a thermal fusing. In this regard, from FIG. 14, it can be seen that the peripheral securing portions of the mount bracket (103) has been integrally connected with the backward side (30B) of sound-conductive cushion element (30).

As far as the embodiment shown in the FIGS. 13 and 14 is concerned, the sound-conductive cushion element (30) is the network cushiony plate element described previously.

As shown, a forward securing portion (100) of the speaker unit (26 or 27) is firmly attached as by rivets (104) or other suitable fastening means to the afore-stated mount bracket (103) that has been integrally formed in the network cushiony plate element (30), such that the forward side (26F or 27F) of the speaker unit (26 or 27) is in a closed contact upon the backward side (30B) of sound-conductive cushion element (30).

Of course, the sound-conductive cushion element (30) may be formed from any other suitable elastic material with air permeability, inclusive of the previously stated thin cushiony plate element of three-layered elastic element as shown in FIG. 7.

As appreciated from the descriptions above, the present invention has the following effects;

(i) The support box (28) is provided independently of the padding (12) and secured in the hole (24) of that padding (12), hence allowing forward and backward movement of both sound-conductive cushion element (30) and speaker support cushiony element (29) via the resilient property of the padding (12). This greatly improves the cushion effect of the center support area of seat back (SB) to give an increased cushiony support touch to the back portion of user which is to rest thereon. Further, the coil springs (34) gives a stable elastic support to such support of the two elements (30) (29), while normally biasing the acoustic unit (13) to a home position in the padding (12). Hence, the acoustic unit (13) is easily movable back and forth in the padding (12) and also stably supported with more cushiony touch, so that a user can enjoy a far improved support touch at his or her back portion.

(ii) The speaker support cushiony element (29) is of an elastic and air-permeable structure, thereby not only adding to the cushiony touch to the user's back portion, but also realizing wide expansion of sounds emitted from the speaker units (26) (27). The formation of acoustic hollow portion (X) in the back side of the speaker support cushiony element (28) effectively increases deep and wide expansion of sounds from the speaker units.

While having described the present invention thus far, it should be understood that the invention is not limited to the illustrated embodiments, but any other modification, replacement and addition may be applied thereto without departing from the scopes of the appended claims.

What is claimed is:

1. An acoustic structure of seat back, comprising:

a padding provided in said seat back, said padding having a forward side situated forwardly of the seat back; a backward side situated backwardly of the seat back; a hole defined therein; and a seat back frame provided therein;

an acoustic unit including: at least one speaker means having a forward side from which a sound is to be emitted and a backward side; and a support box in which said at least one speaker means is supportively received, wherein said support box has: an opened side toward which said forward side of said at least one speaker means faces; and a backward wall opposite to said opened side, said backward wall facing to said backward side of said padding;

said support box being accommodated in said hole of said padding such that a whole of said acoustic unit is disposed in said hole of said padding and that said opened side of the support box faces to the same direction as said forward side of the padding;

a speaker support cushiony element having a forward wall facing forwardly of said seat back and a backward wall facing backwardly of said seat back, said speaker support cushiony element being securely accommodated in said support box such that the backward wall thereof faces to said backward wall of said support box;

said at least one speaker means being resiliently supported in and by said speaker support cushiony element such that the forward side of said at least one speaker means is disposed at the same direction of said forward wall of said speaker support cushiony element;

a sound-conductive cushion element which is juxtaposed and fixed on said speaker support cushiony element, while being supported by said support box, in such a manner that one side of said sound conductive cushion element faces to the same direction as said forward side of said padding, whereas another side of the sound-conductive cushion element faces to said forward wall of said speaker support cushiony element as well as to said forward side of said at least one speaker means; and a trim cover assembly covering said padding and said one side of said sound-conductive cushion element.

2. The acoustic structure as claimed in claim 1, wherein said support box is connected by a resilient connecting means with said seat back frame so as to be resiliently supported in said hole of said padding.

3. The acoustic structure according to claim 2, wherein said resilient connecting means comprises a plurality coil springs extended between said support box and said seat back frame.

4. The acoustic structure according to claim 2, wherein said resilient connecting means comprises at least one spring element extended backwardly of said seat back and at least one securing piece formed in the backward wall of said support box, said at least one securing piece being securely engaged with said at least one spring element.

5. The acoustic structure as claimed in claim 1, wherein an anchoring means is provided to and along said support box and wherein said trim cover assembly is securely anchored by said anchoring means to and along said opened side of said support box.

6. The acoustic structure as claimed in claim 1, wherein said opened side of said support box is formed in a shape generally conforming to a contour of a back portion of a user which is to rest on said seat back, and wherein said sound-conductive cushion element is formed from an elastic plate material.

7. The acoustic structure according to claim 1, wherein said sound-conductive cushion element and said forward wall of said speaker support cushiony element are integrally bonded together by means of a fusing.

8. The acoustic structure according to claim 7, wherein said fusing is one selected from the group consisting of thermal fusing, ultrasound fusing and hot-melt fusing.

9. The acoustic structure as claimed in claim 1, wherein said speaker support cushiony element is of a network structure formed by netting straw-like fibers while bonding straw-like fibers to one another at plural points by means of thermal fusing.

10. The acoustic structure as claimed in claim 1, wherein said sound-conductive cushion element is of a network structure formed by netting straw-like fibers while bonding said straw-like fibers to one another at plural points by means of thermal fusing.

11. The acoustic structure as claimed in claim 1, wherein said sound-conductive cushion element and said speaker support cushiony element are both of a network structure formed by netting straw-like fibers while bonding said straw-like fibers to one another at plural points by means of thermal fusing.

12. The acoustic structure as claimed in claim 1, wherein said speaker support cushiony element is formed from mass of elastic material, and wherein said mass of elastic material is one selected from the group consisting of a soft urethane foam material and a polystyrene foam material.

13. The acoustic structure as claimed in claim 1, wherein said speaker support cushiony element is formed with at least one recessed portion in the backward wall thereof, and wherein said at least one recessed portion is dosed by said backward wall of said support box, thereby defining an acoustic hollow portion between said at least one recessed portion and said backward wall of said support box.

14. The acoustic structure as claimed in claim 1, wherein said another side of said sound-conductive cushion element is in a dose contact upon said forward side of said at least one speaker means.

15. The acoustic structure as claimed in claim 1, wherein said at least one speaker means is firmly connected by a fastening means to a mount bracket which has been integrally connected with said another side of said sound-conductive cushion element, such that the forward side of said at least one speaker means is in a close contact on said another side of said sound-conductive cushion element.

16. The acoustic structure as claimed in claim 1, wherein said at least one speaker means is provided in said speaker support cushiony element in such a manner that the forward side thereof is exposed at the forward wall of said speaker support cushiony element, while the backward side thereof is disposed within said speaker support cushiony element.

* * * * *